May 15, 1951  J. MAYNARD  2,553,141
BAFFLE
Filed Aug. 17, 1945
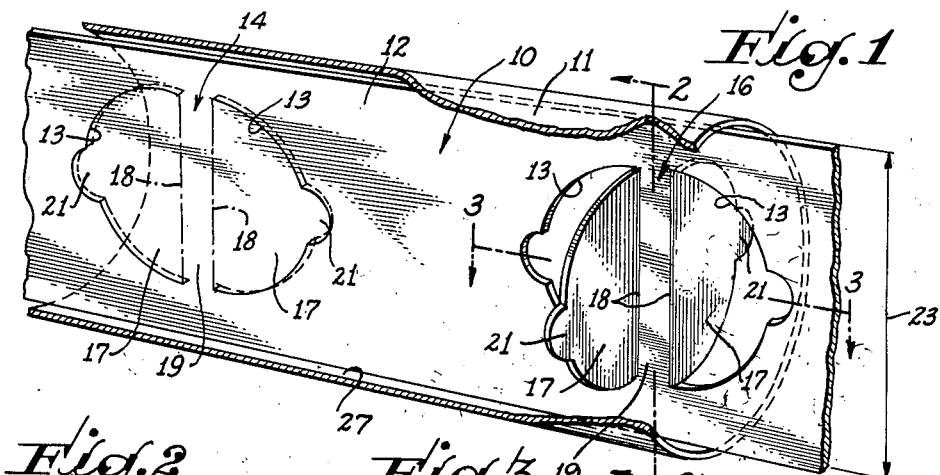
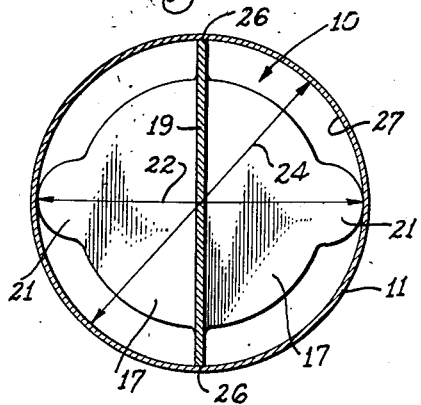
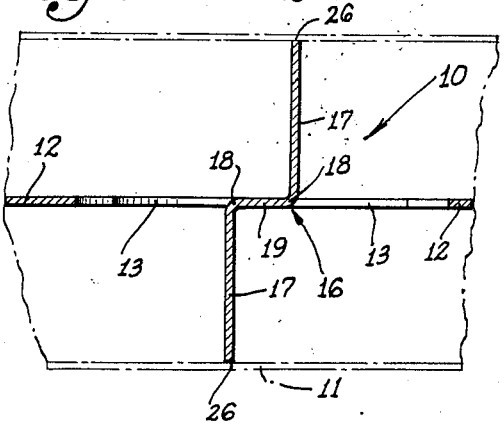
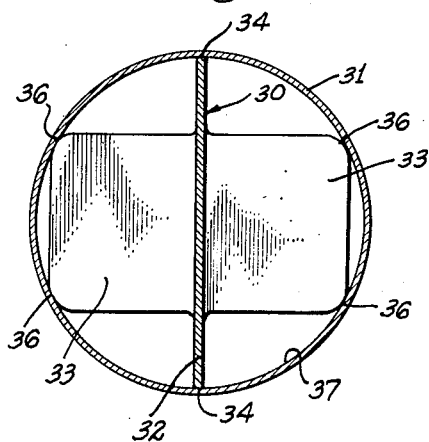
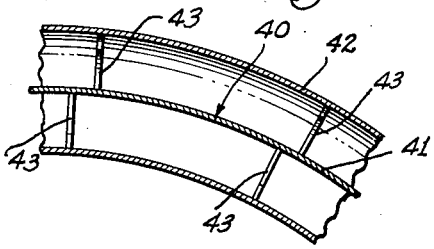
INVENTOR
JAMES MAYNARD
BY
HARRIS, KIECH, FOSTER & HARRIS
FOR THE FIRM
ATTORNEYS Patented May 15, 1951

2,553,141

UNITED STATES PATENT OFFICE 2,553,141

BAFFLE

James Maynard, Hawthorne, Calif., assignor to Elgin Rowland Parker, Seal Beach, Calif.

Application August 17, 1945, Serial No. 610,918

7 Claims. (Cl. 138—37)

My invention relates to baffles and, more particularly, to a device of this general character which is adapted for insertion into tubular members such as tubes, pipes, flues, and the like. A primary objective of my invention is the provision of a baffle which is simple and inexpensive to manufacture and which is preferably fabricated from a single member or from a single strip of material. Another primary objective of my invention is the provision of a method of fabricating a baffle of this general character.

It is frequently necessary to provide baffles in tubes, pipes, flues, or the like to restrict the flow of a fluid therethrough for various reasons. Conventional baffles frequently employ a series of baffle elements which are secured together to provide a baffle which will effect the desired flow restriction. The assembly of such conventional baffles materially complicates manufacturing processes and appreciably increases the cost of the completed article.

In view of the foregoing considerations and in accordance with the primary objectives of my invention, I prefer to provide a baffle which may be fabricated by forming baffle elements integrally with a member which secures the baffle elements together. I prefer to fabricate the baffle by suitably cutting or severing the member to define a baffle element or a pair or baffle elements of the desired configuration and size, each of the baffle elements having an edge which remains secured to the member. The secured edges of the baffle elements are preferably substantially parallel and are separated by a section or strip of the member. The baffle elements may then be bent relative to the member and substantially parallel to the secured edges until the baffle elements are substantially perpendicular to the member. One of the baffle elements is preferably bent in one direction relative to the member and the other is preferably bent in the opposite direction.

If a flow restriction greater than that offered by a single pair of baffle elements is desired, the baffle may be formed of a strip of material which has been severed to define a plurality of longitudinally spaced baffle elements or pairs of baffle elements, the number of pairs of baffle elements being determined by the flow restriction required for a particular installation. The universality of application of the baffle may be increased by severing the strip of material to define more pairs of baffle elements than required to effect the desired flow restriction for a particular installation. Only enough of the baffle elements need be bent relative to the strip of material to effect the desired flow restriction. The flow restriction offered by the baffle may then be varied by varying the number of baffle elements which are bent relative to the strip of material, or by varying the spacing therebetween.

Another objective of my invention is the provision of a baffle which may be inserted in arcuate tubes, pipes, flues, etc., by forming the baffle of a flexible material.

The objectives and advantages expressed by the foregoing general considerations may be realized by means of the exemplary embodiments and applications of my invention which are described in the following disclosure wherein various other advantages will be made evident. The exemplary embodiments and applications of my invention are shown in the accompanying drawing, which is for illustrative purposes only, wherein:

Fig. 1 is a partially-sectioned perspective view illustrating an application of one embodiment of my invention to a tubular member of circular cross section;

Fig. 2 is a transverse sectional view taken as indicated by the broken line 2—2 of Fig. 1;

Fig. 3 is a longitudinal sectional view taken along the broken line 3—3 of Fig. 1;

Fig. 4 is a transverse sectional view illustrating another embodiment of my invention; and Fig. 5 is a longitudinal sectional view illustrating an application of my invention to an arcuate tubular member.

Referring particularly to Figs. 1 through 3, a baffle 10 is disposed in a tubular member 11 and includes a member 12 which is preferably an elongated strip of material as illustrated. The strip 12 is preferably cut along lines 13 in any suitable manner to define pairs 14 and 16 of substantially semi-circular baffle elements 17, the baffle elements 17 each having a diametral edge 18 which remains secured to the strip 12. The baffle elements 17 are separated by a section 19 of the strip 12, the secured edges 18 of each pair 14 and 16 of baffle elements 17 preferably being substantially parallel.

The baffle elements 17 of the pair 16 are bent relative to the strip 12 and substantially parallel to their respective secured edges 18 and are preferably bent until the baffle element 17 are substantially perpendicular to the strip 12. The elements 17 of the pair 16 are preferably bent in opposite directions relative to the strip 12.

Each baffle element 17 is preferably provided with an integral projection 21 thereon and as illustrated in Fig. 2, the span 22 of the projections 17 when bent relative to the strip 12 is substantially equal to the width of the strip 12 and the inside diameter of the tubular member 11. The projections 21 of the baffle elements 17 and longitudinal edges 26 of the strip 12 engage the inner wall 27 of the tubular member 11 to position the baffle 10 within the tubular member 11, and preferably to retain it therein by virtue of the resiliency or flexibility of the material forming the baffle 10. The baffle elements 17 thus serve as means for securing the baffle 10 to the inner wall 27 of the tubular member 11.

The strip 12 may be severed to define any desired number of pairs of baffle elements 17 in addition to the pairs 14 and 16 illustrated. If desired, the baffle elements 17 of some of the pairs need not be bent relative to the strip 12 as exemplified by the baffle elements 17 of the pair 14 of Fig. 1. Thus, if the restriction to flow in the tubular member 11 offered by the baffle 10 is to be varied, such variations may be effected readily by varying the number of baffle elements 17, or pairs 16 of baffle elements 17 which are bent relative to the strip 12. The unused baffle elements 17 of the pair 14 will not interfere with the operation of the baffle 10 and permit a greater universality of application thereof.

It should be noted that only the ends of the projections 21 on the baffle elements 17 and the edges 26 of the strip 12 engage the inner wall 27 of the tubular member 11. Since the engagement between the baffle 10 and tubular member 11 involves only a small area, no part of the baffle 10 shrouds the inner wall 27, thereby avoiding accumulations of dust, soot, etc., thereon. Conventional baffle constructions may include shrouds which engage the entire periphery of the inner wall 27 and tend to encourage the accumulation of dust and soot which may be carried by the slow-moving boundary layer of a fluid within the tubular member 11. The baffle 10 avoids the encouragement of deposits of foreign material from such a boundary layer by permitting the employment of a smooth inner wall 27 which is substantially free from projections that tend to accumulate foreign matter.

It will be understood that the width of the strip 12 may be varied for use with tubular members 11 of various sizes and that the size of the baffle elements 17 may also be varied relative to the strip 12. The baffle 10 may be employed with tubular members of various cross-sectional configurations such as circles, squares, etc., and the configurations of the baffle elements 17 may also be varied to meet the requirements of a particular installation. It will be apparent that the flow restriction offered by the baffle 10 may also be varied by varying the angles of the baffle elements 17 relative to the strip 12. The baffle 10 may also be used in any passageway to divert a fluid toward or away from the walls thereof, the angles of the baffle elements 17 relative to the strip 12 being such that the desired diversion of the fluid is achieved.

The embodiment of my invention illustrated in Fig. 4 includes a baffle 30 which is disposed in a tubular member 31. The baffle 30 includes a member 32 which has been severed in a manner similar to that previously described to define rectangular baffle elements 33. The baffle elements 33 are bent relative to the member 32 in a similar manner and the edges 34 of the member 32 and the corners 36 of the baffle elements 33 engage the inner wall 37 of the tubular member 31 to position and secure the baffle 30 therein.

The baffle shown in Fig. 5 and designated by the numeral 40 is formed of a flexible strip 41 which may be bent readily to permit insertion of the baffle 40 into an arcuate tubular member 42. The baffle 40 is provided with a plurality of baffle elements 43 which are fabricated as previously described.

The various embodiments are fabricated by severing the members or strips of which the baffles are formed in any suitable manner to define baffle elements of the desired shape and size. The strips or members may be severed to define the baffle elements by a stamping operation, for example, as is well known in the art. The baffle elements are then bent relative to the strips or members and, if desired, the baffle elements may be sufficiently thin to permit effecting the bending operation manually.

Although I have herein described various exemplary embodiments and applications of my invention, I do not intend to be limited to the specific disclosures contained herein since various changes, modifications, and substitutions may be included without departing from the spirit of the invention as defined by my appended claims.

I claim as my invention:

1. As an article of manufacture, a member including a pair of baffle elements which are formed integrally therewith, each of said baffle elements having an edge which is unitarily secured to said member, said secured edges being substantially parallel and being separated by a substantially rectangular section of said member, the sides of said substantially rectangular section being defined by said secured edges of said baffle elements, and each of said baffle elements being bent substantially parallel to said secured edge thereof until substantially perpendicular to said member, one of said baffle elements being bent in one direction relative to said member and the other being bent in the opposite direction.

2. As an article of manufacture, a strip of material including a plurality of longitudinally spaced pairs of adjacent baffle elements which are formed integrally therewith, each of said baffle elements having an edge which is unitarily secured to said strip of material, said secured edges of said baffle elements of each pair being substantially parallel and being separated by a section of said strip of material having substantially parallel edges which coincide with said secured edges of said baffle elements of said pair, and each of the baffle elements of at least one of said pairs being bent substantially parallel to said secured edge thereof until substantially perpendicular to said member, one of said baffle elements of said one pair being bent in one direction relative to said strip of material and the other of said baffle elements of said one pair being bent in the opposite direction.

3. A baffle comprising a central plate member having a pair of baffle elements extending substantially perpendicular therefrom on opposite sides thereof, said baffle elements being spaced apart in a plane normal thereto and being connected to said plate member along edges which are separated by a substantially rectangular portion of said plate member.

4. As an article of manufacture, a member having a pair of baffle elements formed integrally therewith, one of said baffle elements being bent outwardly on one side of said member and toward one end thereof, and the other of said baffle elements being bent outwardly on the opposite side of said member and toward the opposite end thereof.

5. A baffle comprising a plate member having a substantially semi-circular baffle element connected thereto along its diametral edge, the diameter of said baffle element being less than the width of said plate member, and said baffle element having a projection thereon which extends radially from the circumference thereof a distance substantially equal to one-half of the difference between the diameter of said baffle element and the width of said plate member.

6. A baffle which is adapted to be inserted in a tube or the like, comprising an elongated strip having a plurality of baffle elements on either side thereof, each of said baffle elements extending outwardly from said strip a distance substantially equal to one-half of the width of said strip measured normal to said strip, and the width of said strip being substantially equal to the internal diameter of the tube whereby the edges of said strip and the ends of said baffle elements engage the inner wall of the tube when said baffle is inserted therein so as to center said baffle in the tube.

7. As an article of manufacture, a member having a pair of baffle elements thereon, each of said baffle elements having an edge which is secured to said member, said secured edges of said baffle elements being substantially parallel and being separated by a section of said member having substantially parallel edges which substantially coincide with said secured edges, one of said baffle elements extending transversely from said member on one side thereof and the other of said baffle elements extending transversely from said member on the opposite side thereof.

JAMES MAYNARD.

REFERENCES CITED

The following references are of record in the file of this patent:

UNITED STATES PATENTS

| Number | Name | Date |
| --- | --- | --- |
| 2,096,272 | Young | Oct. 19, 1937 |
| 2,359,288 | Brinen | Oct. 3, 1944 |

FOREIGN PATENTS

| Number | Country | Date |
| --- | --- | --- |
| 109,888 | Australia | Mar. 7, 1940 |